United States Patent
Madden et al.

(10) Patent No.: US 10,446,860 B2
(45) Date of Patent: Oct. 15, 2019

(54) FLOW FIELD CONFIGURATION FOR FUEL CELL PLATE

(75) Inventors: Thomas H. Madden, Glastonbury, CT (US); Timothy W. Patterson, West Hartford, CT (US)

(73) Assignee: AUDI AG, Ingolstadt (DE)

( * ) Notice: Subject to any disclaimer, the term of this patent is extended or adjusted under 35 U.S.C. 154(b) by 632 days.

(21) Appl. No.: 14/123,666

(22) PCT Filed: Jun. 23, 2011

(86) PCT No.: PCT/US2011/041548
§ 371 (c)(1),
(2), (4) Date: Dec. 3, 2013

(87) PCT Pub. No.: WO2012/177255
PCT Pub. Date: Dec. 27, 2012

(65) Prior Publication Data
US 2014/0093812 A1    Apr. 3, 2014

(51) Int. Cl.
*H01M 8/04* (2016.01)
*H01M 8/04082* (2016.01)
(Continued)

(52) U.S. Cl.
CPC ....... *H01M 8/04201* (2013.01); *H01M 8/026* (2013.01); *H01M 8/0258* (2013.01);
(Continued)

(58) Field of Classification Search
None
See application file for complete search history.

(56) References Cited

U.S. PATENT DOCUMENTS 1,348,206 A  *  8/1920  Chubb ................. H01G 9/048
                                                          361/436
5,641,586 A     6/1997  Wilson
(Continued)

FOREIGN PATENT DOCUMENTS

DE    10 2007 021 909 A1    11/2008
JP         62-237678 A       10/1987
(Continued)

OTHER PUBLICATIONS

DE102007021909—Nov. 13, 2008—English Translation using Espacenet.*
(Continued)

*Primary Examiner* — Haroon S. Sheikh
(74) *Attorney, Agent, or Firm* — Seed IP Law Group LLP

(57) ABSTRACT

A method of manufacturing a plate for a fuel cell includes the steps of providing flow channels in a fuel cell plate. Multiple fuel cell plates are joined into a cell stack assembly. A blocking plate is affixed to the fuel cell plate and at least partially obstructs the flow channels. The blocking plate is affixed to the fuel cell plate after the plates have been arranged into the cell stack assembly. The resulting fuel cell provides a fuel cell plate having a perimeter with an edge. The fuel cell plate includes flow channels extending to the edge. The blocking plate is affixed to the fuel cell plate at the edge to at least partially block the flow channel. In this manner, an inexpensive fuel cell plate may be used, and the blocking plate can be configured to create terminated flow channels, which may be used to provide an interdigitated flow field.

12 Claims, 4 Drawing Sheets

(51) Int. Cl.
*H01M 8/2404* (2016.01)
*H01M 8/2483* (2016.01)
*H01M 8/026* (2016.01)
*H01M 8/241* (2016.01)
*H01M 8/0271* (2016.01)
*H01M 8/0263* (2016.01)
*H01M 8/1004* (2016.01)
*H01M 8/2485* (2016.01)
*H01M 8/0258* (2016.01)

(52) U.S. Cl.
CPC ....... *H01M 8/0263* (2013.01); *H01M 8/0271* (2013.01); *H01M 8/1004* (2013.01); *H01M 8/241* (2013.01); *H01M 8/2404* (2016.02); *H01M 8/2483* (2016.02); *H01M 8/2485* (2013.01); *Y02P 70/56* (2015.11)

(56) References Cited

U.S. PATENT DOCUMENTS

| | | |
|---|---|---|
| 6,416,892 B1 | 7/2002 | Breault |
| 6,780,533 B2 | 8/2004 | Yi et al. |
| 7,803,497 B2 | 9/2010 | Tighe et al. |
| 2002/0110719 A1* | 8/2002 | Pien .......................... C25B 9/18 429/423 |
| 2004/0091760 A1 | 5/2004 | Mizutani et al. |
| 2004/0157103 A1 | 8/2004 | Takeguchi et al. |
| 2005/0069751 A1* | 3/2005 | Zhang ................. H01M 8/0228 429/414 |
| 2005/0069757 A1 | 3/2005 | Stefener et al. |
| 2005/0191541 A1 | 9/2005 | Gurau et al. |
| 2007/0099061 A1 | 5/2007 | Na et al. |
| 2008/0152987 A1 | 6/2008 | Nakashima et al. |
| 2008/0292938 A1 | 11/2008 | Perry et al. |

FOREIGN PATENT DOCUMENTS

| | | |
|---|---|---|
| JP | 8-213044 A | 8/1996 |
| JP | 9-312168 A | 12/1997 |
| JP | 2004-253366 A | 9/2004 |
| JP | 3580028 B2 * | 10/2004 |
| JP | 2005-5247 A | 1/2005 |
| JP | 2007-123145 A | 5/2007 |
| JP | 2009-21080 A | 1/2009 |
| JP | 2010-113895 A | 5/2010 |
| WO | 2010/082931 A1 | 7/2010 |
| WO | 2010/123478 A1 | 10/2010 |
| WO | 2013/184547 A1 | 12/2013 |

OTHER PUBLICATIONS

Roser—DE102007021909A1—Human Translation.*
JP3580028B2—MachineTranslation (Year: 2004).*
Extended European Search Report, dated Mar. 23, 2015, for European Application No. 11868365.5—1360 / 2724410, 11 pages.
PCT Search Report for PCT Application PCT/US2011/041548. Completion of Search: dated Mar. 22, 2012.
PCT International Preliminary Report on Patentability for PCT Application PCT/US2011/041548. dated Dec. 23, 2013.

* cited by examiner

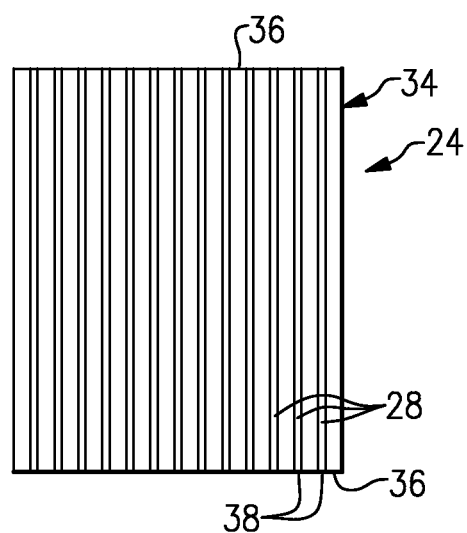
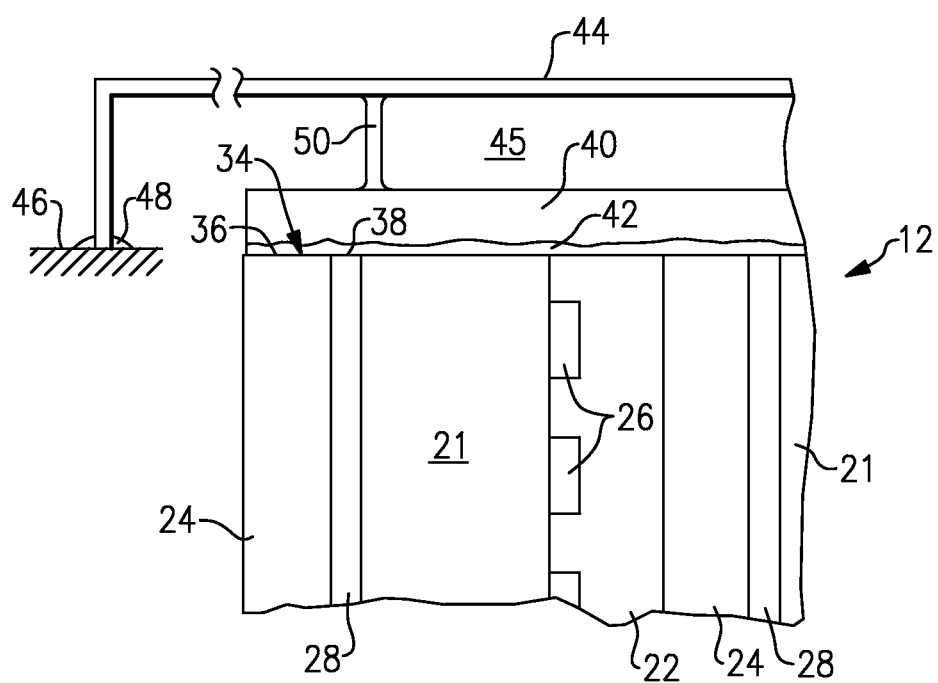

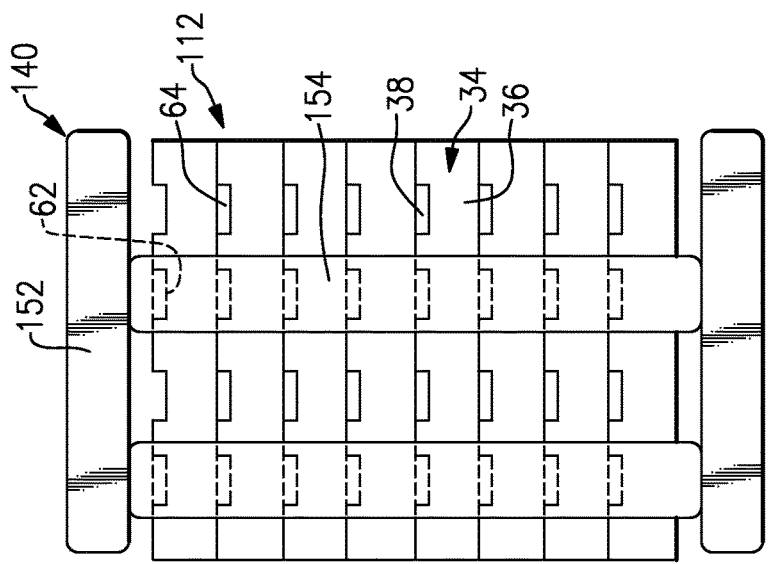
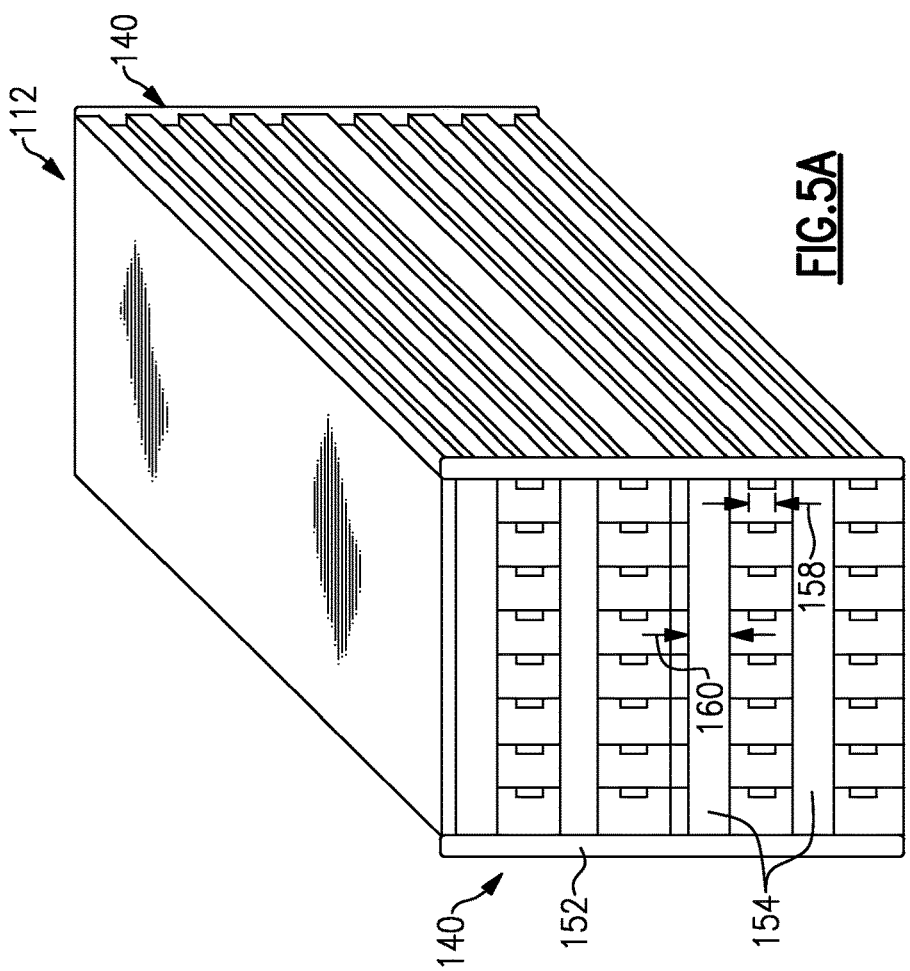

FLOW FIELD CONFIGURATION FOR FUEL CELL PLATE

BACKGROUND

This disclosure relates to a fuel cell plate. In particular, the disclosure relates to a flow field configuration for use with porous bipolar plates, for example.

It is desirable to provide efficient and cost effective fuel cells. Fuel cell bipolar plates are typically fairly expensive components. One reason that bipolar plates are expensive is that they use complex flow geometries, which are created by an end milling machining operation, which is time-consuming and expensive. A less expensive machining operation, such as gang-milling, can be utilized if the flow channels are linear. While such plates are more cost effective, they also may be less efficient during fuel cell operation due to poor mass transport of reactants to the fuel cell electrodes.

SUMMARY

A method of manufacturing a plate for a fuel cell includes the steps of providing flow channels in a fuel cell plate. Multiple fuel cell plates are joined into a cell stack assembly. A blocking plate is affixed to the fuel cell plate and is arranged to at least partially obstruct the flow channels. The blocking plate is affixed to the fuel cell plate after the plates have been arranged into the cell stack assembly.

The resulting fuel cell provides a fuel cell plate having a perimeter with an edge. The fuel cell plate includes flow channels extending to the edge. The blocking plate is affixed to the fuel cell plate at the edge to at least partially block the flow channel. In this manner, an inexpensive fuel cell plate may be used, and the blocking plate can be configured to create terminated flow channels, which may be used to provide an interdigitated flow field.

BRIEF DESCRIPTION OF THE DRAWINGS

The disclosure can be further understood by reference to the following detailed description when considered in connection with the accompanying drawings wherein:

FIG. 2 is a top elevational view of an example fuel cell plate.

FIG. 3 is a partial cross-sectional view of a fuel cell stack with a blocking plate.

FIGS. 5A-5B are respectively perspective and side elevational views of the cell stack assembly with another example blocking plate.

DETAILED DESCRIPTION

Figure 1:
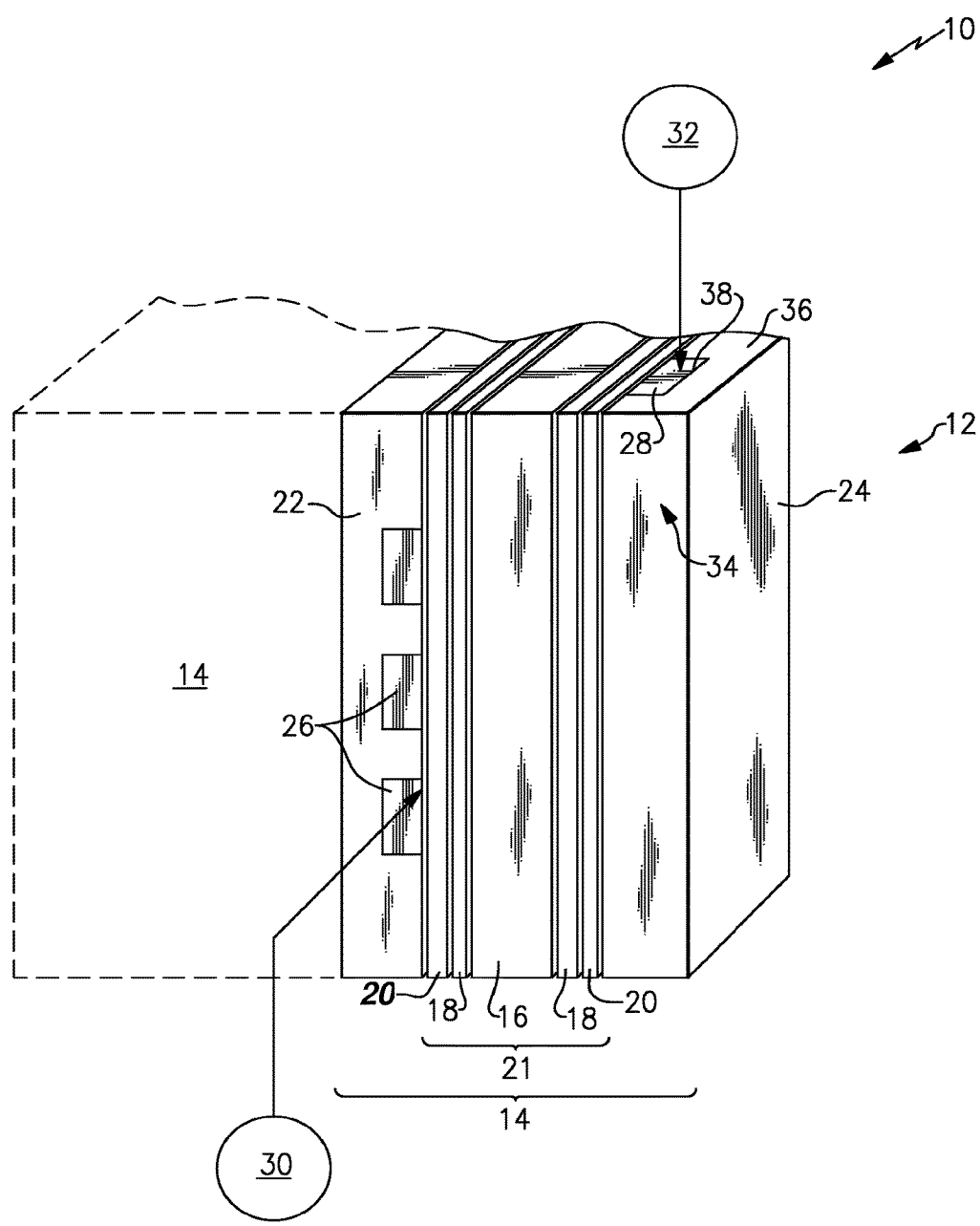
FIG. 1 is a highly schematic view of an example fuel cell.

A fuel cell 10 is schematically illustrated in FIG. 1. The fuel cell 10 includes a cell stack assembly 12 comprising multiple cells 14 joined to one another. Each cell 14 includes a unitized electrode assembly (UEA) 21 arranged between an anode plate 22 and a cathode plate 24. In one example, the anode and cathode plates 22, 24 are bipolar. The UEA 21 includes catalyst layers 18 arranged on either side of a proton exchange membrane (PEM) 16. A gas diffusion layer (GDL) 20 adjoins each catalyst layer 18.

Each anode and cathode plate 22, 24 respectively includes anode and cathode flow channels 26, 28. A fuel source 30 is in fluid communication with and provides fuel the anode flow channels 26. An oxidant source 32 is fluidly connected with and provides oxidant to the cathode flow channels 28.

The cathode plate 24 is schematically illustrated in FIG. 2. Although a cathode plate is shown, this disclosure also relates to and can be used for anode plates. The cathode plate 24 has a perimeter 34 that defines the exterior surface of the flat plate when arranged in the cell stack assembly 12. The cathode flow channels 28 comprise passages that in the example are parallel to one another and extend in a linear direction between opposing edges 36 where they terminate at ends 38. Other passage configurations may be used if desired.

In one example, the cathode plate 24 is provided by a porous bipolar plate, which is constructed from a graphite material. The cathode plate 24 is manufactured using a flat sheet of porous graphite, which is extruded or gang-milled, for example, to provide the cathode flow channels 28. In this manner, the cathode plate 24 may be manufactured inexpensively.

Linearly extending flow channels may not provide the best fuel cell efficiency during some operating conditions. Accordingly, it is desirable to at least partially obstruct the cathode flow channels 28 at least some of the ends 38 to promote uniform distribution of the oxidant across the entire flow field. Referring to FIG. 3, a blocking plate 40 is affixed, permanently in the example, to the one edge 36 of the perimeter 34 and may be affixed to both of the opposing edges if desired. In one example, a sealant 42 is used to adhere the blocking plate 40 to the exterior of the cell stack assembly 12 and accommodate any irregularities in its exterior surface. In the example, the sealant 42 is not provided axially between the components of the cell stack assembly 12, but rather, the sealant 42 is provided at the perimeter 34 in a location exterior to the cell stack assembly 12. The sealant may be of a type suitable for use in fuel cells.

The blocking member 40 may be constructed from a phenolic laminate, such as a NEMA G-series phenolic material. The blocking plate 40 may be integrated with a manifold 44 that is secured over the cell stack assembly 12 to provide an external manifold, as illustrated in FIG. 3. The manifold 44 is secured relative to a structure 46 with a seal 48. A manifold cavity 45 is provided between the manifold 44 and the cell stack assembly 12, which receives oxidant. The blocking plate 40 may be connected to the manifold 44 by one or more ribs 50, which may be integrally formed with the manifold 44 and blocking plate 40 enabling installation of onto the cell stack assembly 12 as a unitary structure.

Figure 4B:
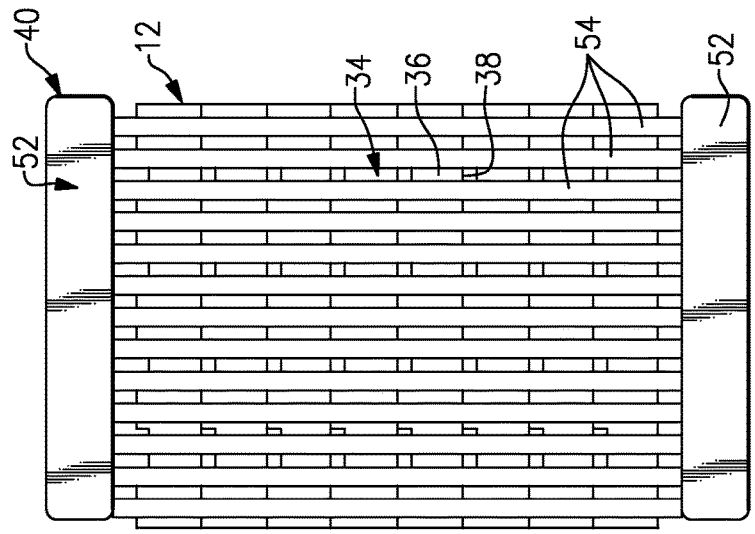
FIGS. 4A-4B are respectively perspective and side elevational views of an example cell stack assembly with one example blocking plate.
Figure 4A:
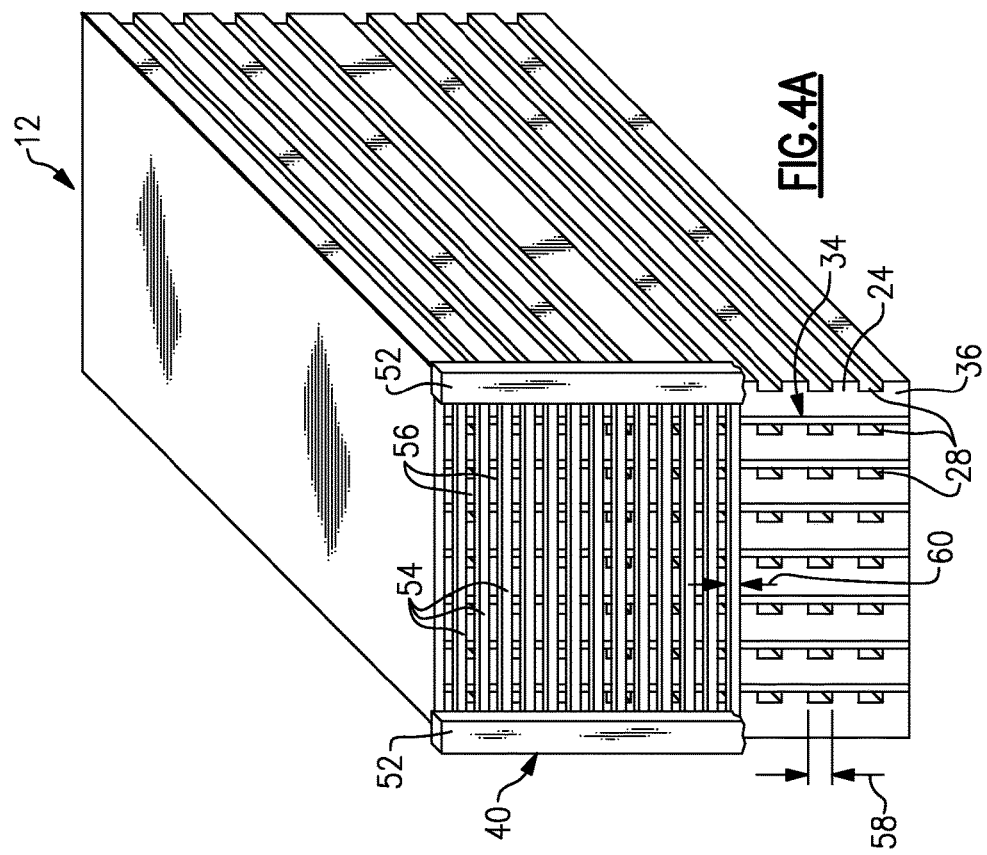

Referring to FIGS. 4A-4B, an arrangement is illustrated in which the blocking plate 40 partially blocks ends 38 of the cathode flow channels 28. In the example, the blocking plate 40 includes support members 52 between which multiple blocking members 54 extend. The blocking members 54 are parallel to one another and provide spaces 56. One example area of the ends 38 is a width of 0.8-1.2 mm (0.03-0.05 inches) and a depth of 0.4-0.64 mm (0.2-0.03 inches). The blocking members 54 provide a blocking width 60. The ends 38 provide a channel width 58 that, in the example, is larger than the blocking width 60. As illustrated in FIG. 4B, only portions of the ends 38 are obstructed.

Another arrangement is illustrated in FIGS. 5A-5B. Like numerals indicate like elements. The cell stack assembly 112 includes a blocking plate 140 that completely obstructs the ends 38 of the cathode flow channel 28. The sealant seals about the ends 38. The channel width 158 is less than the blocking width 160 such that the blocking members 154 cover the ends 38. FIG. 5B illustrates alternating rows of blocked channels 62 and unblocked channels 64, which provides an inter-digitated flow field. A blocking plate 140 is provided at either end of flow field such that one end of the flow field is open and the other end of the flow field is closed to provide an interdigitated configuration. Other flow field configurations may be used if desired.

The resulting fuel cell provides a bipolar plate having a perimeter with an edge. The plate includes flow channels extending to the edge. One blocking plate is affixed to the reactant inlet side of the fuel cell assembly at the edge to at least partially create a flow blockage in half of the inlet flow channels. A second blocking plate is affixed to reactant exit side of the fuel cell assembly to create a flow blockage in half of the exit channels. The blocking plates are designed and arranged such that half of the channels have flow blockage at the reactant inlet side only and half of the channels are blocked at the reactant exit side only. In this manner, an inexpensive fuel cell flow field design may be created which provides an interdigitated flow field, which has been shown to increase fuel cell performance.

Although an example embodiment has been disclosed, a worker of ordinary skill in this art would recognize that certain modifications would come within the scope of the claims. For that reason, the following claims should be studied to determine their true scope and content.

What is claimed is:

1. A method of manufacturing a fuel cell assembly comprising:
   providing flow channels in a plurality of fuel cell plates;
   joining the plurality of fuel cell plates into a cell stack assembly;
   permanently affixing a first blocking plate to the cell stack assembly so that the first blocking plate completely obstructs ends of a first set of the flow channels at a first side of the cell stack assembly and does not obstruct ends of a second set of the flow channels at the first side of the cell stack assembly, wherein the first blocking plate includes a first support member that extends along a length of a first one of the fuel cell plates at a first end of the cell stack assembly, a second support member that extends along a length of a second one of the fuel cell plates at a second end of the cell stack assembly opposite to the first end of the cell stack assembly, and a first plurality of blocking members that each extend from the first support member to the second support member; and
   permanently affixing a second blocking plate to the cell stack assembly so that the second blocking plate completely obstructs ends of the second set of the flow channels at a second side of the cell stack assembly opposite to the first side of the cell stack assembly and does not obstruct ends of the first set of the flow channels at the second side of the cell stack assembly, the first set of the flow channels alternating with the second set of the flow channels, the permanently affixing of the first and second blocking plates to the cell stack assembly thereby forming interdigitated flow fields within the cell stack assembly, wherein the second blocking plate includes a third support member that extends along the length of the first one of the fuel cell plates at the first end of the cell stack assembly, a fourth support member that extends along the length of the second one of the fuel cell plates at the second end of the cell stack assembly, and a second plurality of blocking members that each extend from the third support member to the fourth support member.

2. The method according to claim 1, wherein the providing includes forming the flow channels to extend to respective edges of respective outer perimeters of the plurality of fuel cell plates.

3. The method according to claim 2, wherein the providing includes forming the flow channels as parallel flow channels.

4. The method according to claim 3, wherein the providing includes forming the parallel flow channels to extend to respective pairs of opposing edges of the plurality of fuel cell plates.

5. The method according to claim 4, wherein the providing includes gang milling the parallel flow channels.

6. The method according to claim 2, further comprising securing an external manifold to the cell stack assembly.

7. The method according to claim 6, wherein the securing includes providing a manifold cavity between the blocking plate and the external manifold.

8. The method according to claim 1, wherein the fuel cell plate is a porous fuel cell plate.

9. A fuel cell comprising:
   a fuel cell plate having a perimeter providing a first edge and a second edge opposite the first edge, the fuel cell plate including flow channels extending to the first edge and to the second edge;
   a first blocking plate affixed to the fuel cell plate at the first edge to completely obstruct ends of a first set of the flow channels including every other one of the flow channels at the first edge and to not obstruct ends of a second set of the flow channels including every other one of the flow channels at the first edge, wherein the first blocking plate includes a first support member that extends parallel to the fuel cell plate, a second support member that extends parallel to the fuel cell plate, and a first plurality of blocking members that each extend from the first support member to the second support member;
   an external manifold secured to the fuel cell plate such that a manifold cavity is provided between the first blocking plate and the external manifold, wherein the first blocking plate is integrally formed with the external manifold such that the first blocking plate and the external manifold form a unitary structure; and
   a second blocking plate affixed to the fuel cell plate at the second edge to completely obstruct ends of flow channels not obstructed by the first blocking plate at the second edge and to not obstruct ends of flow channels completely obstructed by the first blocking plate at the second edge, wherein the second blocking plate includes a third support member that extends parallel to the fuel cell plate, a fourth support member that extends parallel to the fuel cell plate, and a second plurality of blocking members that each extend from the third support member to the fourth support member,
   wherein the first and second blocking plates completely obstructing ends of the flow channels forms an interdigitated flow field within the fuel cell plate.

10. The fuel cell according to claim 9, further comprising a sealant adhering the first and second blocking plates to the fuel cell plate.

11. The fuel cell according to claim 9, wherein the first and second blocking plates are made of a phenolic laminate.

12. The method according to claim 1, wherein the first and second blocking plates are made of a phenolic laminate.

\* \* \* \* \*